Jan. 20, 1942.     B. H. BROWALL     2,270,501
AUTOMATIC DOUBLE-ACTING SLACK ADJUSTER FOR BRAKES
Filed Oct. 3, 1940     2 Sheets-Sheet 2
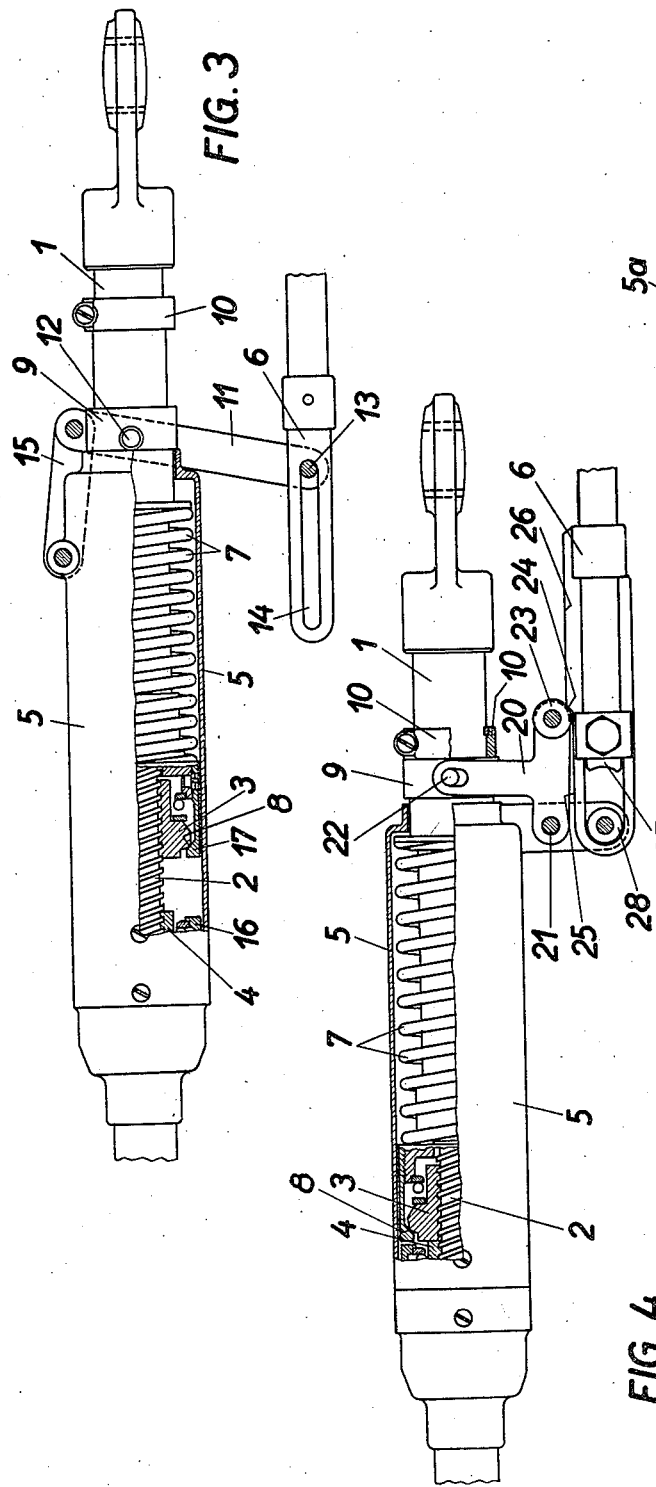
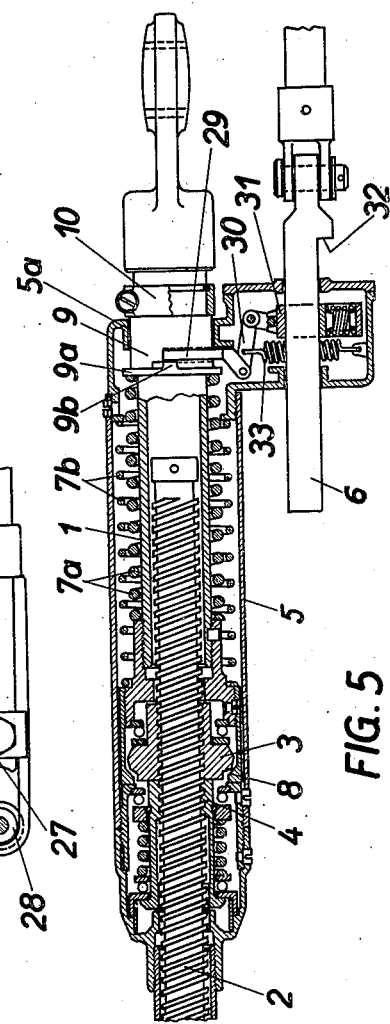
Inventor:
B. H. Browall,
By G. F. Klindworth
Atty Patented Jan. 20, 1942

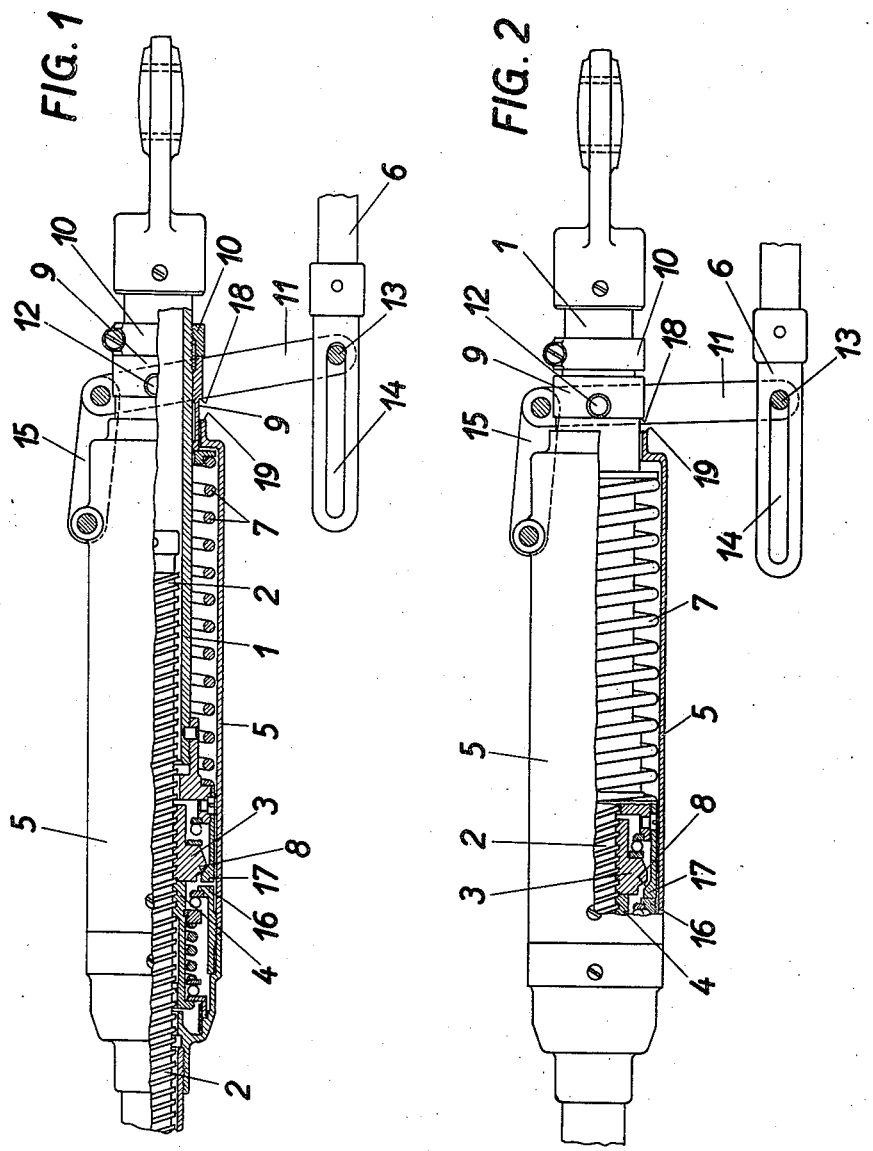

2,270,501

UNITED STATES PATENT OFFICE 2,270,501

AUTOMATIC DOUBLE-ACTING SLACK-ADJUSTER FOR BRAKES

Bert Henry Browall, Malmo, Sweden, assignor to Svenska Aktiebolaget Bromsregulator, Malmo, Sweden, a corporation of Sweden Application October 3, 1940, Serial No. 359,624
In Germany August 14, 1939

6 Claims. (Cl. 188—202)

This invention relates to automatic double-acting slack adjusters for brakes of the kind comprising a brake rod divided into two parts which are movable axially in relation to each other in both directions for increasing the slack when too small and for reducing the slack when too large. More particularly the invention relates to slack adjusters of this kind in which the relative movement of the two brake rod parts in the direction for increasing the slack when too small is effected by the stresses arising too early in the brake rigging during a braking operation and is limited by a locking mechanism so controlled in dependence on the movements of the brake that a certain length of the brake piston stroke determines the action of the locking mechanism. Principally it has already been proposed (see British Specification No. 421,759) to construct this locking mechanism so that, should the positive control thereof in dependence on the brake piston stroke fail to operate, a slack increasing movement of the slack adjuster automatically sets the locking mechanism into action for stopping such movement. The object of this invention is to realise the said proposal in connection with automatic double-acting slack adjusters of the type in which the locking mechanism comprises a coupling member between the relatively movable brake rod parts and a control member for said coupling member, which is movable axially on one of the brake rod parts and during each application of the brake is moved against the action of a strained spring from normal to active position for stopping slack increasing movement of the slack adjuster by a mechanism operating in dependence on the application stroke of the brake. In known slack adjusters of this type the said spring serves the purpose of returning the control member into normal position during release of the brake and to hold the control member in such position at released brake until, at the next braking operation, the control member is moved against the action of the spring by the operating mechanism. Due to this fact the said spring has prevented the coupling member from being moved into active position for stopping slack increasing movement of the slack adjuster at a failure of the operating mechanism. This invention contemplates such an arrangement of the return spring for the axially movable control member that the ability of the spring to hold the control member in normal position, in which the coupling member is out of engagement, will be dependent on the condition of the operating mechanism so that, should the operating mechanism fail to operate the control member, the latter, unrestrained by the spring, can take a position permitting engagement of the coupling member for firmly coupling the two brake rod parts to each other in the slack increasing direction.

The invention is illustrated by way of examples in the accompanying drawings in which:

Figs. 1, 2 and 3 are plan views, partly in section, of a slack adjuster according to one form of the invention with the operating mechanism in three different positions.

Fig. 4 is a plan view, partly in section, of a slack adjuster according to a second form of the invention with the operating mechanism in normal position at released brake.

Fig. 5 is a similar view of a slack adjuster according to a third form of the invention with the operating mechanism in a position after the beginning of an application of the brake.

The slack adjuster comprises a brake rod divided into two parts 1 and 2. The part 1 is tubular. The part 2 consists of a screw spindle which is movable axially in both directions in the part 1 and carries a coupling member in the form of a so called coupling nut 3 and also a so called adjusting nut 4 which latter at application and release of the brake is moved axially in one direction and the other, respectively, by means of a control member 5 movable axially on the brake rod part 1. The control member 5 is operated by an operating mechanism working in dependence on the movements of the brake and comprising an operating rod 6 and a return spring 7. The control member 5 serves the purpose not only of moving the adjusting nut 4 provided for the reduction of the slack when too large, but also of controlling the coupling nut 3 in the following manner. During each application of the brake the control member 5, preferably by means of the adjusting nut 4, moves the coupling nut 3 out of engagement with a seat 8 provided on the rod part 1, and holds the coupling nut 3 out of such engagement until the brake piston stroke has reached a certain length.

When the piston stroke exceeds the said certain length, the coupling nut 3, due to the control member 5 then being moved by its operating mechanism, is permitted to engage and support itself against the seat 8 in the slack increasing direction and thus firmly couple the brake rod parts 1 and 2 to each other in this direction.

If the slack is too small the braking stress at a braking operation sets in too early, that is before the coupling nut 3 has been permitted to engage the seat 8, so that the brake rod parts 1 and 2 are moved in relation to each other in the slack increasing direction by the beginning braking stress, until such movement is stopped by the coupling nut 3 being permitted to engage the seat 8. For a detailed explanation of this function of the slack adjuster for increasing the slack when too small, as well as of the function of the slack adjuster for reducing the slack when too large, my U. S. Patent No. 2,225,001 is referred to, the coupling nut 3, the adjusting nut 4 and its connection with the control member 5 being illustrated in the drawings of this application practically in the same manner in which they are illustrated in Fig. 5 in the said U. S. patent.

According to the invention the action of the strained return spring 7 on the movable control member 5 is mediated by a spring support 9 which is movable axially on the same brake rod part 1 as the control member 5 and is limited in respect of its movement in the direction of the action of the return spring by means of an abutment 10. In the form of the invention illustrated in Figs. 1 to 3 this abutment 10 is axially adjustable on the rod part 1. Further according to the invention means operable by the operating mechanism for the control member 5 are provided for supporting the control member 5 against the spring support 9. In the form of Figs. 1 to 3 said means comprises a two-armed lever 11 pivoted by means of pins 12 to the sleeve-shaped movable spring support 9 and provided at one end with a bolt 13 passing through a slot 14 in the operating rod 6, and a link 15 connecting the other end of the lever 11 to the control member 5. The operation of this form of the invention is as follows.

Fig. 1 shows the parts with the operating mechanism for the movable control member 5 in the normal position at released brake. In this position the strained spring 7 supports itself against the supporting sleeve 9 which in turn supports itself against the abutment 10. Since thus in this position of the parts the power of the strained spring 7 is bound between relatively fixed axial supports for the same on the rod part 1, the spring exerts no action on the control member 5, and the lever 11 gets no support at the bolt 13 by the operating rod 6. Consequently, the coupling nut 3 can abut its seat 8 and thus lock the slack adjuster against slack increasing movement under the action of switching shocks or the like at released brake. Fig. 2 shows the parts in a position after the beginning of an application of the brake. The operating rod 6 supports the lever 11 at the bolt 13 and has moved it to the left on the drawing so that the control member 5 with an abutment 16 abuts a corresponding abutment 17 on the rod part 1 and so that the coupling nut 3 is moved out of engagement with the seat 8. At the continued movement of the bolt 13 to the left by the operating rod 6 the supporting sleeve 9 is forced away from the abutment 10 and moved to the left under compression of the spring 7. Now the spring 7 acts with its whole power on the pivot pins 12 of the lever 11 and, consequently, holds the control member 5 with its abutment 16 pressed against the abutment 17 on the rod part 1 as a result of the support of the lever 11 by the operating rod 6 and the link 15. This axial support of the control member 5 against the movable supporting sleeve 9 by the intermediary of the parts 11 and 15 continues until the supporting sleeve 9 with an abutment 18 abuts a corresponding abutment 19 on the control member 5. When this occurs the lever 11 cannot be further rotated, and at the continued movement of the operating rod 6 the lever 11, the supporting sleeve 9 and the control member 5 will be taken with in unison in this movement, whereby the control member 5 is moved with its abutment 16 away from the abutment 17 on the rod part 1 and permits the coupling nut 3 to engage its seat 8 and thus lock the slack adjuster in the slack increasing direction as shown in Fig. 3. Should the positive control of the control member 5 and thus the above mentioned support of the lever 11 through the operating rod 6 against the power of the spring 7 fail for some reason or the other at a braking operation, the above mentioned support of the control member against the supporting sleeve 9 by the intermediary of the parts 11 and 15 falls away so that the coupling nut 3 also during the application of the brake remains in engagement with the seat 8 and thus locks the slack adjuster against all slack increasing movement.

In the form of Fig. 4 there is provided for the support of the control member 5 against the supporting sleeve 9 a bell crank lever 20 which is pivoted by means of a pin 21 on the control member 5 and at one end engages a pin 22 on the supporting sleeve 9. At the other end the lever 20 is provided with a roller 23 for coaction with an incline 24 and two guiding surfaces 25 and 26 of different heights on each side of the said incline on the operating rod 6. In the normal position at released brake the roller 23 rests on the lower guiding surface 25, and in this position the control member 5 is displaced so much to the left in relation to the supporting sleeve 9 that the control member 5 permits the coupling nut 3 to abut its seat 8. At the beginning of an application of the brake the roller 23 is lifted by the incline 24 on to the higher guiding surface 26, whereby the control member 5 is displaced to the right in relation to the supporting sleeve 9 by the lever 20 and moves the coupling nut 3 out of engagement with the seat 8, thereby unlocking the slack adjuster in the slack increasing direction. At the reach of a certain length of the brake piston stroke an abutment 27 on the operating rod 6 abuts a roller 28 on the control member 5 so that at the continued movement of the operating rod 6 in relation to the rod part 1 the lever 20, the supporting sleeve 9 and the control member 5 are taken along in this movement in unison.

In the form of Fig. 5 the return spring power is apportioned to two springs 7a and 7b. The spring 7a acts between the rod part 1 and the supporting sleeve 9, whereas the spring 7b at released brake holds the control member 5 in the right end position but is too weak for withstanding the forces which at a braking operation tend to move the coupling nut 3 against its seat 8. However, at released brake the spring 7b holds the control member 5 with an abutment 5a at the greatest possible distance from the flange 9a on the supporting sleeve 9. The flange 9a is provided with projections 9b, and a sliding bolt 29 can be moved in between these projections 9b and the abutment 5a on the control member 5 by means of a bell crank lever 30 which at a commencing movement of the brake in the application or release direction is rotated in one direction or the other, respectively, by a spring pressed friction shoe 31 coacting with the operating rod 6. At release of the brake the bolt 29 is withdrawn from its active position between the projections 9b and the abutment 5a so that at released brake the control member can move to the left for permitting the coupling nut 3 to engage its seat 8. At a commencing brake application movement the bolt 29 is moved by the lever 30 into the active position shown in Fig. 5, in which the control member 5 holds the coupling nut 3 out of engagement with the seat 8 until, at the reach of a certain length of the brake piston stroke, an abutment 32 on the operating rod 6 abuts the control member 5 and takes the latter along in the continued movement of the operating rod 6. At a failure of the positive control of the control member 5 by the operating rod 6 the bolt 29 is moved into the inactive position by a spring 33 so that the coupling nut 3 also during the brake application movement remains in engagement with the seat 8 and thus locks the slack adjuster against all slack increasing movement.

In the herein illustrated constructional forms of the invention the threads of the coupling and adjusting nuts 3, 4 and the spindle 2 are of such a pitch as to be non-selflocking so that the axial movements of the nuts on the spindle take place under rotation of the nuts. The invention, however, can be utilised to the same advantage also in slack adjusters in which the spindle and the axially movable coupling and adjusting members are constructed in a different way.

What I claim and desire to secure by Letters Patent is:

1. An automatic double-acting slack adjuster for brakes of the character described, comprising a brake rod divided into two parts movable axially in relation to each other not only in a slack reducing but also in a slack increasing direction, and means for controlling the relative movements of said brake rod parts, including a mechanism for locking said brake rod parts against slack increasing movement, a control member movable axially on one of said brake rod parts, spring means for moving said control member in one direction during release of the brake, operating means for positively moving said control member against the action of said spring means in the other direction during application of the brake for permitting said locking mechanism to lock said brake rod parts against slack increasing movement, and means operable by said operating means for mediating the action of said spring means on said axially movable control member for rendering the action of said spring means on said control member dependent on said operating means, so that, should said operating means fail to operate said control member, the latter, unrestrained by said spring means, can take a position permitting said locking mechanism to lock said brake rod parts against slack increasing movement.

2. An automatic double-acting slack adjuster for brakes of the character described, comprising a brake rod divided into two parts movable axially in relation to each other not only in a slack reducing but also in a slack increasing direction, and means for controlling the relative movements of said brake rod parts, including a member on one of said brake rod parts for coupling it to the other brake rod part in the slack increasing direction, a control member movable axially on said other brake rod part, spring means for moving said control member in one direction during release of the brake for setting said coupling member out of action, an operating rod for positively moving said control member against the action of said spring means in the other direction during application of the brake for setting said coupling member into action, a support for said spring means, movable axially on said other brake rod part, means for limiting movement of said spring support in the direction of the action of said spring means, and means operable by said operating rod for supporting said control member against said spring support for rendering the action of said spring means on said control member dependent on said operating rod, so that, should said operating rod fail to operate said control member, the latter, unrestrained by said spring means, can move in the direction for setting said coupling member into action.

3. An automatic double-acting brake slack adjuster as claimed in claim 2, in which said means for supporting said control member against said spring support comprises a two-armed lever pivoted on said spring support and linked at one end to said operating rod and at the other end to said control member.

4. An automatic double-acting brake slack adjuster as claimed in claim 2, in which said means for supporting said control member against said spring support comprises a bell crank lever which is pivoted on said control member and which at one end is engaged with said spring support, said operating rod being provided with an incline and on both sides thereof with guiding surfaces of different heights, with which the other end of said lever coacts.

5. An automatic double-acting brake slack adjuster as claimed in claim 2, in which said means for supporting said control member against said spring support comprises a sliding bolt movable in and out of active position between said control member and said spring support, a lever and a friction shoe coacting with said operating rod being arranged for moving said bolt in and out of the active position at a commencing movement of the brake in the application and release direction, respectively.

6. An automatic double-acting brake slack adjuster as claimed in claim 2, in which said means for limiting the movement of said spring support in the direction of the action of said spring means comprises an abutment axially adjustable on said brake rod part.

BERT HENRY BROWALL.